Patented Feb. 14, 1950

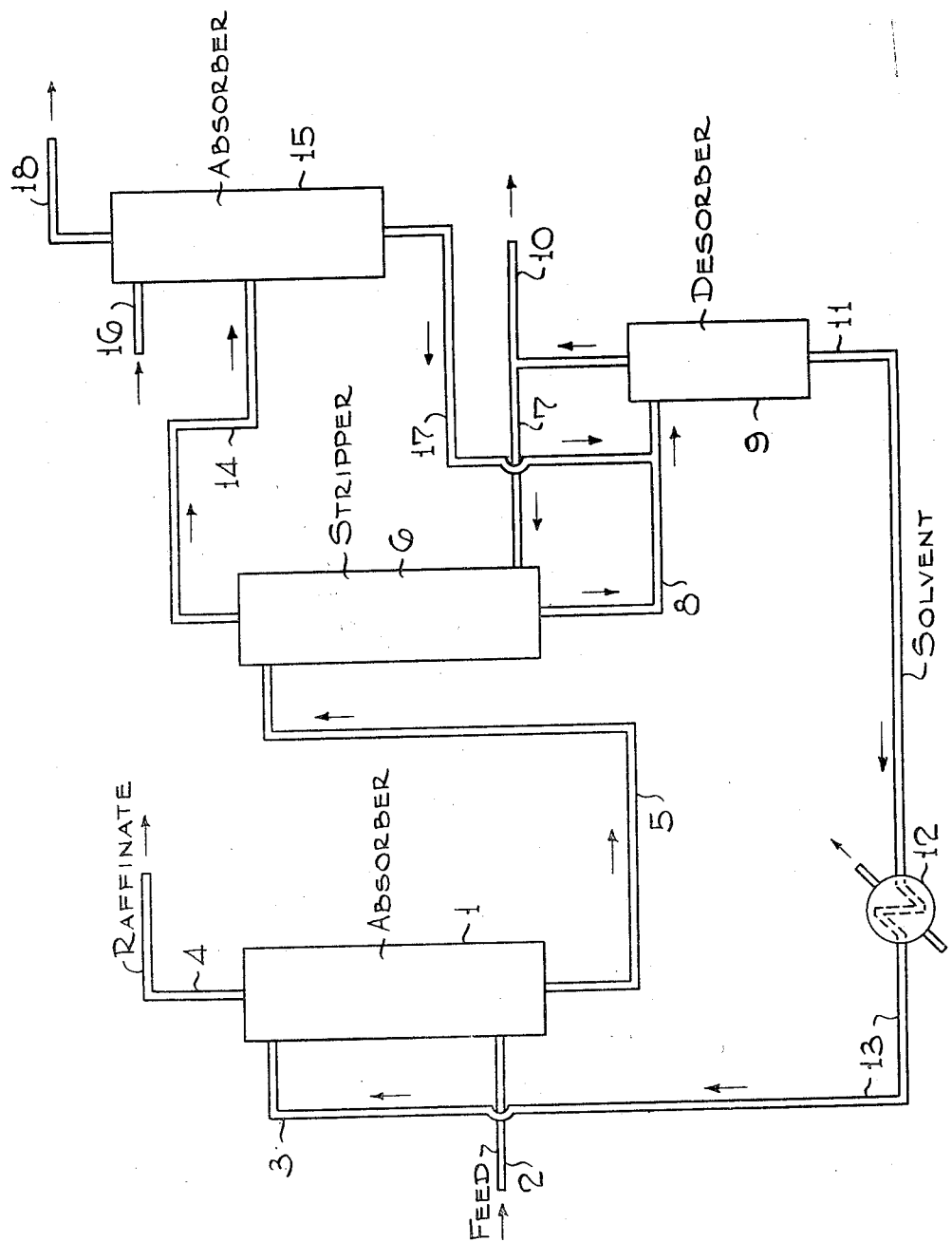

2,497,159

UNITED STATES PATENT OFFICE 2,497,159

SEPARATION OF OLEFINS

Egi V. Fasce, Baton Rouge, La., assignor to Standard Oil Development Company, a corporation of Delaware Application February 24, 1949, Serial No. 78,100

7 Claims. (Cl. 260—677)

This invention relates to separations between isomeric C₅ mono-olefins, particularly between alpha and beta C₅ mono-olefins and between normal and branched pentenes.

This application is a continuation-in-part of U. S. application 634,887, filed December 13, 1945, now U. S. Patent No. 2,494,546 in which the separation between isomeric butenes is disclosed and claimed.

It is known that cuprous salt solutions absorb olefins to a greater extent than paraffins and absorb diolefins to a greater extent than mono-olefins. It is also known that the solubility in the cuprous salt solutions decreases as the number of carbons in the molecule in each of these olefins increases.

According to the present invention, it has now been found and demonstrated that the solubility in certain cuprous salt solutions of olefins having the same number of carbon atoms in the molecule varies according to the structure of these hydrocarbons, the normal mono-olefins having the double bond in the alpha position being much more soluble than the other normal or branched mono-olefins. This variation in solubility holds particularly for the isomeric pentenes and permits a separation of the pentenes, which are otherwise difficult to separate by other methods including fractional distillation, if the proper kind of cuprous salt solutions are used. The proper type of cuprous salt solution for this purpose is in general characterized by cuprous salts, preferably of fatty acids, such as cuprous acetate, dissolved in an amine or organic nitrogen base such as, preferably methyl amine or pyridine, or cuprous sulfate in pyridine.

As a typical method of preparing the cuprous salt solutions, excess cuprous oxide in metallic copper is mixed with a solution prepared by partially neutralizing liquid mono-methylamine with an aqueous solution of an acid and the mixture is stirred for a number of hours at a temperature of about 80° C. Variations can be made in the kind of organic base used as the solvent, e. g. presence of dimethylamine, pyridine or others, which dissolve the cuprous salts and form a homogeneous stable solution. Also, the anions of the cuprous salt may be varied by having other fatty acid anions, such as the lactate, tartrate, glycolate and still others substituted for the acetate anion.

The C₅ mono-olefins are available from various sources, such as steam cracking of gas oil and catalytic dehydrogenation of pentanes. The crude mixtures of C₅ mono-olefins will contain compounds shown in the following table:

TABLE I

Mono-olefins in cracked C₅ fraction

| Component | B. P., °C. |
|---|---|
| Pentene-1 | 30.0 |
| 2-Methylbutene-1 | 31.1 |
| Pentene-2: | |
| Trans- | 35.9 |
| Cis- | 37.0 |
| Trimethylethylene | 38.4 |

A method used for separating the isomeric pentenes by selective absorption from their mixtures comprises contacting the mixture with a cuprous salt-amine solution in an absorption vessel from which air is excluded and cooling the absorbed mixture to a desired temperature, e. g. —29° C. to +38° C., then separating the resulting cuprous salt solution extract from unabsorbed hydrocarbons and desorbing the absorbed pentene at a higher temperature, for example, 72° C. to 83° C.

EXAMPLE I

The power of a cuprous salt-amine solution to selectively absorb pentene-1 from mixtures with its isomers is illustrated in the following table:

TABLE II

Relative selectivities for pentenes of cuprous acetate mono-methyl amine solution

[Mono-methyl amine containing 2/1 amine to acetate ratio and 5M H₂O per liter]

| Run | First Olefin [1] | Second Olefin | Percentage of First Olefin | | Total Volumes C₅ Desorbed per volume Copper Solution |
|---|---|---|---|---|---|
| | | | In Desorbed C₅ | In Unabsorbed C₅ | |
| 1 | P-1 | P-2 | 62 | 48 | 4.4 |
| 2 | P-1 | TME | 72 | 48 | 4.0 |
| 3 | TME | 2-MB-1 | 56 | 50 | 3.3 |

[1] P-1 is pentene-1. P-2 is pentene-2. TME is trimethylethylene. 2-MB-1 is 2,methylbutene-1.

As shown in the foregoing table a good separation of pentene-1 from the isomeric pentenes was indicated. Next in order, the solvent preferentially absorbs the normal pentenes, both alpha and beta.

Additional specific examples illustrating the relative selectivities of the cuprous salt-amine solutions for the various pentenes are given as follows:

EXAMPLE II

A C₅ isoprene-containing fraction was first treated to remove isoprene leaving a mixture of close-boiling pentenes boiling in the range of 28° C–37.5° C. This mixture, 200 volumes, was mixed with 1100 volumes of a 2N cuprous sulfate-pyridine solution at 0° C. in an absorption vessel, and then was settled to separate an extract phase from a raffinate phase at atmospheric pressure. The extract was subjected to heating for desorption of the absorbed hydrocarbons and upon analysis it was found that the product recovered was mainly pentene-1 boiling below 31° C. at atmospheric pressure although the initial mixture contained higher boiling pentenes in substantial amounts. It was determined that the relative solubility of pentene-1 with respect to tri-methylethylene was roughly 5:1 in the copper pyridine solution, thus showing that pentene-1 could be readily separated in a practical operation from its branched chain isomers.

For further understanding of the invention, reference may be had to the accompanying drawing in which the single figure is in an elevational view, generally diagrammatic, showing apparatus or means suitable for carrying out the process of the present invention.

Referring to the drawing, a C₅ cut containing a mixture of pentenes boiling in the range of about 30° C. to 38° C. is passed into an absorption tower 1 through line 2. Tower 1 may contain bubble plates or packing and can be operated at from about atmospheric to 200 p. s. i. g. from about −29° C. to +38° C. The solvent which is a cuprous salt dissolved in a basic organic amine enters the top of the tower 1 through line 3 and flows downwardly and countercurrently to the mixed hydrocarbons rising in the tower. Unabsorbed hydrocarbons, otherwise known as raffinate, leave the top of tower 1 through line 4. In tower 1, mostly pentene-1 is dissolved in the solvent, while the isomeric pentenes, such as 2-methylbutene-1, pentene-2 and trimethylethylene are removed overhead through line 4. The solvent containing the dissolved pentene-1 flows from tower 1 through line 5 to stripper 6, wherein the solvent containing the absorbed hydrocarbons is contacted countercurrently with recycled pentene-1 vapors introduced at about 38° C. to 72° C. into the bottom of stripper 6 through line 7. In stripper 6 any of the higher boiling pentene isomers are stripped from the solvent, leaving in solution substantially pure pentene-1. The thus stripped solvent containing pentene-1 leaves the bottom of stripper 6 through line 8 and is heated to a desorption temperature in the range of 72–83° C. and is introduced into the top of desorber 9 above a top plate therein. This desorber may contain either bubble plates or a combination of plates and packed sections and is maintained at a controlled temperature for desorbing and distilling off pentene-1. Under these conditions, essentially pure pentene-1 vapor is withdrawn through line 10 as product. Some of this product is diverted through line 7 to act as the stripping agent in stripper 6. The denuded solvent which reaches the bottom of desorber 9 is withdrawn through line 11, cooled in cooler 12 to the proper absorption temperature, e. g. of the order of 0° C. and is returned by lines 13 and 3 to the top of absorption tower 1.

The overhead from stripper 6 may be removed through line 14 and passed to a second absorption tower 15, similar to tower 1, to be contacted again with cuprous salt-amine solution introduced through line 16 at a temperature of below 38° C. to selectively absorb any remaining pentene-1, and a solution of pentene-1 in the solvent may be passed by line 17 to desorber 9 for removal of the pentene-1.

If a C₅ diolefin is present in the initial crude mixture, such as isoprene, the isoprene is absorbed in tower 1 with mainly pentene-1; then in the stripper 6, mainly pentene-1 with relatively small amounts of isoprene are taken overhead through line 14 to the second absorption tower 15, wherein the isoprene is reabsorbed, and the pentene-1, remaining unabsorbed at higher temperatures of the order of 72° C. to 83° C., is taken overhead as product through line 18. Tower 15 may be operated at pressures from atmospheric to 200 p. s. i. g.

Thus the present method of separation between the pentene isomers may be employed to concentrate one or more of the normal pentenes, and pentene-1 and/or pentene-2 in separating these pentenes from the branched pentenes, such as the trimethylethylene and 2-methylbutene-1. This separation may be applied to a mixture of the pentenes in a C₅ fraction which is free of C₅ diolefins, or it may even be used if the C₅ diolefins are present. For example, the raffinate obtained in the extraction of the C₅ diolefins, such as by employing an aqueous acetone solvent or similar aqueous polar solvent will contain a mixture of the pentenes, and the present method may be applied to the resulting mixed pentenes. Or on the other hand, the present process may be applied to the crude mixture containing the diolefins to advantageously eliminate trimethylethylene after which the isoprene mixed with the normal pentenes can be treated by an extractive distillation with a polar solvent such as aqueous acetone to separate the normal pentenes without the interference of trimethylethylene, which tends to give difficulty in such an extractive distillation.

Of the numerous cuprous salt solutions investigated for the selective extraction of pentene-1 the solutions found most suitable are cuprous acetate-alkyl amine and cuprous sulfate pyridine solutions. Of these solutions, the best have compositions defined by: amine anion mol ratios of 2:1 to 3:1, 0 to 10 mol water per liter and 1.5 to 2.5 mols copper content. These solutions are non-corrosive and stable. They have capacities for the pentene-1 and isoprene which are similar to the capacities of cuprous acetate-ammonium solutions for the unsaturated C₄ hydrocarbons. The selectivity of the solvent is defined as the purity of a particular hydrocarbon desorbed from the solution under fixed conditions, e. g. equilibrium at 2.0° C. The capacity likewise relates to the purity of the unabsorbed hydrocarbon and is the gaseous volumes of the pure hydrocarbon desorbed from one volume of the solvent under the equilibrium conditions, the volume being measured under standard conditions.

In the cuprous salt the cuprous ion may be combined with a variety of anions including anions of mineral acids but these tend to be acidic and corrosive. For example, the anions may be sulfate, nitrate, phosphate, and chloride, borate and the like. From the selectivity and capacity the sulfate ion is the best.

As indicated in the examples and many other tests, the separation between the normal and branched pentenes can be carried out by selective absorption of the normal pentenes in cuprous salt-amine solutions which are preferably amine solutions containing a cuprous salt of a fatty acid best represented by cuprous acid in methyl amine and cuprous sulfate in pyridine.

What is claimed is:

1. The process of separating the mixture of hydrocarbons containing a normal pentene and branched pentenes which comprises contacting said mixture and with a solution of cuprous salt in an organic nitrogen base at a temperature between $-29°$ C. and $+38°$ C. and a pressure from about atmospheric to 200 pounds per square inch gauge to form an extract solution containing the normal pentene and a non-absorbed raffinate fraction containing the branched pentene, and separating the extract solution from the raffinate fraction.

2. The process of claim 1, in which said cuprous salt is cuprous acetate and the organic nitrogen base is mono-methylamine.

3. The process of claim 1, in which said cuprous salt is cuprous sulfate and the organic nitrogen base is pyridine.

4. The process of separating pentene-1 from a mixture containing its higher boiling isomers which comprises contacting said mixture in a first absorption zone with a cuprous salt-amine solution at a temperature between $-29°$ C. and $+38°$ C. to form an extract solution containing pentene-1 and a raffinate fraction containing the higher boiling isomeric pentene, separating the extract solution from the raffinate fraction and desorbing pentene-1 from the separated extract solution.

5. The process of separating a mixture of hydrocarbons boiling in the range of $-29°$ C. to $+38°$ C., which includes pentene-1, pentene-2, isoprene and trimethylethylene which comprises contacting said mixture in a first absorption zone with a cuprous salt-amine solution at a temperature between $-29°$ C. and $+38°$ C. and pressures from atmospheric to 200 pounds per square inch gauge to form an extract solution containing isoprene and pentene-1 and a raffinate fraction containing the isomeric pentenes, passing the extract solution into a stripping zone, passing a stream of isoprene vapor through said stripping zone to displace pentene-1 from the extract solution therein, removing a separate mixture of pentene and isoprene from the stripping zone, passing said mixture of pentene-1 and isoprene into a second absorption zone where it is contacted with a cuprous salt-amine solution at between 72° C. and 83° C. to form an extract solution containing the isoprene, and removing from second absorption zone unabsorbed pentene-1.

6. The process of separating pentene-1 from its mixture with pentene-2, which comprises contacting said mixture with a cuprous salt-amine solution at a temperature between $-29°$ C. and $+38°$ C. under a pressure from atmospheric to 200 pounds per square inch gauge to form an extract solution containing the pentene-1 and a raffinate fraction containing the pentene-2, and thereafter desorbing pentene-1 from the extract solution.

7. The process of separating normal pentenes from their branched isomeric pentenes in a mixture thereof which comprises contacting said mixture with a cuprous salt-amine solution at a temperature between $-29°$ C. and $+38°$ C. under a pressure from atmospheric to 200 pounds per square inch gauge to form an extract solution containing the normal pentenes and a raffinate fraction containing the branched pentenes, and thereafter desorbing the normal pentenes from the extract solution.

EGI V. FASCE.

REFERENCES CITED

The following references are of record in the file of this patent:

UNITED STATES PATENTS

| Number | Name | Date |
|---|---|---|
| 2,005,500 | Joshua | June 18, 1935 |
| 2,342,990 | Welling | Feb. 29, 1944 |
| 2,451,376 | Bernard et al. | Oct. 12, 1948 |